United States Patent Office 3,242,110
Patented Mar. 22, 1966

3,242,110
ADHESIVE COMPOSITION CONTAINING AN ELASTOMER AND A POLYMERIC ELASTIC SOLID TACKIFIER
Ralph Korpman, East Brunswick, N.J., assignor to Johnson & Johnson, a corporation of New Jersey
No Drawing. Filed Apr. 30, 1962, Ser. No. 191,284
4 Claims. (Cl. 260—5)

The present invention relates to pressure-sensitive adhesives and, more particularly, to pressure-sensitive adhesives formed from natural and synthetic elastomers modified by the inclusion of a tackifying agent.

It has heretofore been the general practice in the manufacture of pressure-sensitive adhesives from elastomeric materials, such as natural and synthetic rubbers, to mix with the elastomeric material a tackifying agent to give the elastomer sufficient permanent tackiness to adhere to other objects through the application of light pressure. Tackifying agents which have generally been used in the past for this purpose are solid materials, such as rosin and rosin derivatives, polyterpene resins and coumarone indene resins. These generally used tackifying materials are friable, brittle solids at room temperature and are generally effective as tackifiers only if blended with the elastomer in amounts generally substantially less than the weight of the elastomer present, and even with highly compatible resins of this type in amounts generally not appreciably over the amount of elastomer used.

Although pressure-sensitive adhesives made from elastomers so tackified can be prepared having excellent pressure-sensitive adhesive qualities, the cost of the pressure-sensitive adhesive is largely determined by the cost of the elastomer which, as previously indicated, is the main ingredient in the pressure-sensitive adhesive. In addition to elastomer and resin, fillers or other materials may be added to further modify the characteristics of the pressure-sensitive adhesive obtained. Although in most instances the tackifier is less expensive than the elastomer used in making the pressure-sensitive adhesive, advantage could not be taken of this lower cost to reduce the cost of the pressure-sensitive adhesive, since inclusion of the tackifier in amounts greater than a 1:1 ratio will substantially reduce the tack of the pressure-sensitive adhesive obtained; and, if too great amounts of the tackifier are used, the adhesive qualities of the pressure-sensitive adhesive can be destroyed entirely. By adhesive properties of pressure-sensitive adhesive as heretofore used is meat the ability of the adhesive surface to immediately wet and adhere to another surface when applied only with light pressure. This characteristic of the pressure-sensitive adhesive might be better referred to as "quick-stick," which will be the term hereinafter used both in the specification and the claims.

With the pressure-sensitive elastomer adhesives formulated through use of the conventional solid brittle tackifiers, where the adhesive is to be solvent spread, it is generally found that 185 to 450 parts by weight of solvent per 100 parts of adhesive are required to place the tackified elastomer into solution suitable for solvent spreading. This large amount of solvent must be removed from the pressure-sensitive adhesive in the manufacturing process; and unless expensive solvent recovery apparatus is used, substantial expense will be encountered due to the loss of the solvent driven off from the solvent-spread pressure-sensitive adhesive. Likewise, the capacity of the drying ovens are limited because of the large amount of solvent to be evaporated.

It has now been discovered that if an elastic solid tackifier, compatible with the elastomer, is used excellent pressure-sensitive adhesives can be obtained while avoiding many of the disadvantages which are present with the use of the solid brittle tackifiers heretofore employed. The compatibility of the elastic solid tackifier can be readily determined by casting a film of a blend of the elastomer and the elastic solid tackifier on a glass panel and checking the clarity of the film cast. A compatible tackifier will, in such a case, give a clear film.

The elastic solid tackifiers used in the present invention are resinous polymeric materials generally having a low molecular weight as compared to the molecular weight of elastomeric materials such as rubber, both natural and synthetic. Also, although these tackifiers are referred to as elastic, they do not show complete recovery to their initial form after deformation by stretching, but only partial recovery. These materials also show or possess plastic flow properties, such as generally would be encountered in low molecular weight resinous materials, the elastic solid tackifiers generally not having a number average molecular weight in excess of 6,000 measured in a vapor pressure osmometer.

The elastic solid tackifiers can be blended with the conventional elastomers used in making pressure-sensitive adhesives in a wide range of proportions, pressure-sensitive adhesives being obtained with as little as 25 parts of elastic solid tackifier per 100 parts of rubber and up to amounts in excess of 500 parts elastic tackifier per 100 parts of rubber. Such elastomers in the specification and claims will be referred to as adhesive elastomers. If the elastic tackifier is used with substantial amounts of filler, still larger amounts of tackifier may be used. In cured pressure-sensitive adhesive formulations, amounts even in excess of 700 parts elastic solid tackifier per 100 parts elastomer may be employed.

Elastic solid tackifiers are available at costs substantially less than the cost of the elastomers used in making pressure-sensitive adhesive tapes. Thus a substantial saving in cost of the final pressure-sensitive adhesive product can be realized by using pressure-sensitive adhesive formulations in which the amount of elastic solid tackifier present is substantially greater than the elastomer used.

Another advantage of the pressure-sensitive adhesive compositions of the present invention, using the elastic solid tackifier, is that the pressure-sensitive adhesive blend of the elastomer and tackifier form coatable solutions at much higher solids than pressure-sensitive adhesive blends of elastomer and the conventional tackifiers heretofore used. It has been found that by using the pressure-sensitive adhesive compositions of the present invention, solutions having viscosity as low as 40,000 centipoises can be obtained by using no more than 42 parts of solvent per 100 parts of solids. Such high solid content solutions have the advantage that the solvent can be driven off substantially more rapidly after the pressure-sensitive adhesive has been solvent spread as well as the further advantage of saving in the cost of the solvent used. Although the compositions of the present invention are well-suited for solvent spreading the pressure-sensitive adhesive, the compositions are not limited to solvent spreading but can be calender or extrusion spread without the use of solvents, if it should be so desired.

We have found that any of the conventional elastomer materials used in making pressure-sensitive adhesives can be employed in practicing the present invention. Among these, for example, are included natural and synthetic polyisoprene, NBR (abbreviation used in the trade for acrylonitrile-butadiene rubbers, these are butadiene-acrylonitrile copolymers) SBR (abbreviation used in the trade for styrene-butadiene rubbers, these are butadiene-styrene copolymers), neoprene (the term used in the trade for polychloroprene polymers), butyl rubber (the name used in the trade for rubber-like isoprene-isobutylene copolymers) and polyacrylates, although the practice of the present invention is not limited thereto. Also, in making pressure-sensitive adhesive compositions the pressure-sensitive adhesive may contain any of the conventional fillers and anti-oxidants or other additives which are used in pressure-sensitive adhesive formulations.

Although excellent non-curing pressure-sensitive adhesives result from the practice of the present invention, the invention in its preferred form involves the use of the elastic solid tackifiers in the preparation of cured pressure-sensitive adhesive products. In making such cured pressure-sensitive adhesive products, the elastomer and the elastic solid tackifier are blended together with a curing agent. As previously stated, the proportion of tackifier to the elastomer can vary from 25 to 700 parts of the elastic solid tackifier to 100 parts of the elastomer, the tackifier preferably being used in amounts of 50 to 350 parts by weight of the tackifier to 100 parts by weight of the rubber. The amount of curing agent included would depend on the particular curing agent used and also on the particular elastomer and the proportion of the elastomer to the tackifier, larger amounts of the curing agent generally being preferred where larger amounts of the tackifier are employed. Examples of suitable curing agents are oil-soluble heat-reactive alkyl phenol formaldehyde resins, such as octyl phenol formaldehyde; solvent-based heat-reactive urea formaldehyde resins, such as the butyl alcohol solution of urea formaldehyde; diisocyanates, such as toluene diisocyanate; conventional sulfur; and peroxide curing systems. Where the curing agent used is sulfur or a peroxide, the curing agent would generally be used in very small amounts and substantial benefits are obtained with amounts even as low as .25%. Where the curing agent is of a rubber reactive aldehyde resin type, the curing agent would be used in substantially larger quantities and would generally be present in amounts of *at least* 3 parts by weight as based on the weight of the elastomer and may be present in amounts substantially in excess of the weight of the elastomer. The curing resins can be used in any of the proportions heretofore used where the resins have been added to elastomer-base pressure-sensitive adhesives for forming cured pressure-sensitive adhesive products. As in the normal practice in preparing cured pressure-sensitive adhesive compositions, after the pressure-sensitive adhesive composition is spread onto the backing the pressure-sensitive adhesive composition is cured. However, with some applications the curing may be delayed until the tape is actually in use, as is the situation with some tapes prepared for electrical usage.

In the preferred practice of the present invention, the elastic solid tackifier is formed from a still residue obtained from commercial oil distillation, the residue consisting primarily of indene and isoprene with small amounts of styrene. To this is added butadiene and styrene and the whole polymerized to an elastic solid resin by means of an acid Friedel-Crafts catalysts. The elastic resinous material thus obtained has a molecular weight of 500 to 2,000, a melting point of 125–135° F. (ball and ring method), and an acid number of less than 1.

Materials of this type are presently available on the market under the trade names of Stikvel-P and Stikvel-W.

The practice of the present invention is further illustrated by the following examples which are given for the purpose of illustration only, the invention not being limited thereto.

*Example 1*

100 parts by weight of natural rubber, 200 parts by weight of Stikvel-P, 1 part by weight of ditertiary amyl hydro-quinone, and 1 part by weight of ditertiary butyl meta cresol are blended together in a kneader mixer, and the resulting blend then dissolved in 50 parts by weight of toluene solvent. The resulting solution has a viscosity of 40,000 centipoises. This solution is then spread on impregnated crepe paper at a dry coating weight of 1.75 ounces per square yard and the solvent then evaporated. The resulting pressure-sensitive adhesive-coated sheet is slit into tape and the tape tested for its pressure-sensitive adhesive characteristics. The tape on comparison with a tape made of the same elastomer but using Piccolyte S–70 a polyterpine resin melting at 70° centigrade as the tackifier is found to have excellent "quick-stick," whereas the control sample containing Piccolyte S–70 has no "quick-stick."

*Example 2*

100 parts by weight of natural rubber, 400 parts by weight of Stikvel-P, 1 part by weight of ditertiary amyl hydroquinone, and 1 part by weight of ditertiary butyl meta cresol are dissolved in toluene and coated on impregnated crepe paper at a dry coating weight of 2.0 ounces per square yard. The solvent is evaporated and the coated sheet is slit into tape. The tape has excellent "quick-stick" and has an adhesion to stainless steel of 58 ounces per inch width as measured by the procedure described in A.S.T.M. D–1000.

*Example 3*

An adhesive is composed of:

100 parts by weight—Isoprene 500–W, an elastomer which is 80% polyisoprene and 20% naphthenic oils (about 2,000,000 molecular weight),
250 parts by weight—Stikvel-P,
50 parts by weight—60% titanium dioxide dispersion dissolved in 20% toluene and 20% glycerol ester of hydrogenated rosin,
1 part by weight—ditertiary amyl hydroquinone, and
1 part by weight—ditertiary butyl meta cresol.

This adhesive composition is dissolved in toluene and coated on an impregnated crepe paper backing at a dry coated weight of 2.0 ounces per square yard. The adhesive is dried and the coated sheet is slit into tape form. The tape has excellent "quick-stick" and an adhesion to stainless steel of 27 ounces per inch width.

*Example 4*

100 parts by weight of Isoprene 500 (80% polyisoprene, of which 92% is cis-1,4-polyisoprene, and 20% naphthenic oils), 100 parts by weight of a fine particle clay filler, 500 parts by weight of Stikvel-P, 1 part by weight of ditertiary amyl hydroquinone, and 1 part by weight of ditertiary butyl meta cresol are dissolved in toluene and coated on any impregnated crepe paper backing at a dry coating weight of 2.00 ounces per square yard. The solvent is evaporated and the coated backing is slit into tape form. The tape has excellent "quick-stick" and has an adhesion value of 58 ounces per inch width.

*Example 5*

100 parts by weight of crude rubber, 150 parts by weight of Stikvel-P, 24 parts of a heat reactive octyl phenol formaldehyde resin sold commercially as Amberol ST–137, 1 part by weight of ditertiary amyl hydroquinone, and 1 part by weight of ditertiary butyl meta cresol are dissolved in toluene and coated on an impregnated crepe paper at a dry coating weight of 2.0 ounces per square yard. The solvent is removed and the coated sheet is heated for 10 minutes at 325° F. to cure the adhesive. The coated sheet is then slit into tape form. The tape has good "quick-stick" and an adhesion value of 45 ounces per inch witdh.

In describing the present invention, the description has been directed primarily to the making of sheet materials. The pressure-sensitive adhesive compositions of the present invention, however, because of the small amount of solvent needed for solvent application of the same, are well adapted to be sold as solvent solutions which can then be applied by the user, either by brush application or by ejection of tube or other coating techniques, including aerosol dispensing of adhesives. Where sold in solvent solution form for later application by the user, it is preferred that the solvent used be a relatively volatile solvent so that rapid evaporation of the solvent will occur after the pressure-sensitive adhesive solution is applied.

Having thus described my invention, I claim:

1. A pressure-sensitive adhesive composition consisting essentially of (a) an elastomer of the group consisting of natural and synthetic polyisoprenes, butadiene-acrylonitrile copolymers, butadiene-styrene copolymers, polychloroprene, isoprene-isobutylene copolymers and polyacrylates and (b) a polymeric elastic solid tackifier compatible with said elastomer and intimately blended therewithin amounts ranging from 150 to 500 parts by weight of the tackifier for each 100 parts of the elastomer, said polymeric elastic tackifier being the Friedel-Crafts polymerization product of still residue from commerical oil distillation high in indene and isoprene to which has been added butadiene and styrene and having a molecular weight within the range of about 500 to 2000, a melting point of about 125°–135° F. and an acid number of less than 1.

2. A pressure-sensitive adhesive of claim 1 in which there is also present a curing agent and in which said pressure-sensitive adhesive has been cured.

3. A pressure-sensitive adhesive of claim 2 in which said elastomer is polyisoprene and said curing agent is an oil-soluble heat reactive urea formaldehyde resin.

4. A pressure-sensitive adhesive tape comprising a backing containing thereon, and firmly adhered thereto, a cured pressure-sensitive adhesive composition of claim 1.

References Cited by the Examiner
UNITED STATES PATENTS

| | | | |
|---|---|---|---|
| 2,322,886 | 6/1943 | Saunders et al. | 260—5 |
| 2,349,508 | 5/1944 | Mack | 260—896 |
| 2,366,219 | 1/1945 | Soday | 260—5 |
| 2,500,517 | 3/1950 | Carswell | 260—852 |
| 2,549,539 | 4/1951 | Sparks et al. | 260—5 |
| 2,894,925 | 7/1959 | Morris et al. | 260—896 |
| 2,971,863 | 2/1961 | Kindseth et al. | 260—5 |

SAMUEL H. BLECH, *Primary Examiner.*

WILLIAM H. SHORT, MURRAY TILLMAN,
*Examiners.*